United States Patent [19]

Fukasawa et al.

[11] Patent Number: 5,028,103
[45] Date of Patent: Jul. 2, 1991

[54] OPTICAL SCANNING APPARATUS

[75] Inventors: Motomu Fukasawa, Kawasaki; Masamichi Tateoka, Yokohama, both of Japan

[73] Assignee: Canon Kabushiki Kaisha, Tokyo, Japan

[21] Appl. No.: 581,194

[22] Filed: Sep. 11, 1990

Related U.S. Application Data

[63] Continuation of Ser. No. 490,545, Mar. 5, 1990, abandoned, which is a continuation of Ser. No. 397,344, Aug. 23, 1989, abandoned, which is a continuation of Ser. No. 206,489, Jun. 14, 1988, abandoned.

[30] Foreign Application Priority Data

Jun. 15, 1987 [JP] Japan ................. 62-148205

[51] Int. Cl.$^5$ ............................................. G02B 26/10
[52] U.S. Cl. ..................................... 350/6.8; 350/6.5; 250/578.1
[58] Field of Search ................... 350/6.5, 6.6, 6.7, 6.8, 350/479; 250/234, 235, 236, 578.1

[56] References Cited

U.S. PATENT DOCUMENTS

| | | | |
|---|---|---|---|
| 4,176,907 | 12/1979 | Matsumoto et al. | 350/6.8 |
| 4,179,183 | 12/1979 | Tateoka et al. | 350/6.1 |
| 4,343,531 | 8/1982 | Tateoka et al. | 350/6.5 |
| 4,413,878 | 11/1983 | Lettington | 350/6.8 |
| 4,561,717 | 12/1985 | Katsoka et al. | 350/6.8 |
| 4,674,825 | 6/1987 | Tateoka et al. | 350/6.8 |
| 4,707,085 | 11/1987 | Takanashi et al. | 350/6.8 |
| 4,733,072 | 3/1988 | Lettington | 350/6.8 |
| 4,770,517 | 9/1988 | Sakuma | 350/6.8 |

Primary Examiner—Paul M. Dzierzynski
Assistant Examiner—Loha Ben
Attorney, Agent, or Firm—Fitzpatrick, Cella, Harper, Scinto

[57] ABSTRACT

An optical scanning apparatus in which a plurality of scanning light beams are deflected by a light deflector and the deflected light beams impinge onto a spherical lens having an f-$\theta$ characteristic at inclinations with respect to the optical axis of the lens so as to be focused on a scanning object. The apparatus is arranged to meet the following condition:

$$\left| \frac{\pi}{180} \cdot \frac{f \cdot 4h}{L} \sin^{-1}(\sin\theta \cdot \sin|\omega|) + \Delta(\omega) \right| < 2/p$$

where, f represents the focal distance of the spherical lens (mm), $\omega$ represents the effective scanning rotation angle of the light deflector (deg), $\Delta(\omega)$ represents the amount of curve of the scanning line caused by the light deflecting element in the subscanning direction (mm), $p$ represents the resolution of the scan on the scanning object (lines/mm), $\theta$ represents the angle of inclination of any one of the light beams with respect to the optical axis of the lens within a plane which contains the optical axis of the lens and which is perpendicular to the scanning axis (deg), L represents the distance between the first reflection surface of the light deflector and the principal plane of the lens adjacent the scanning object along the optical axis (mm), and h represents the height of incidence of the any one of the light beams to the lens (mm).

11 Claims, 7 Drawing Sheets

OPTICAL SCANNING APPARATUS

This application is a continuation of application Ser. No. 07/490,545 filed Mar. 5, 1990, now abandoned, which was a continuation of application Ser. No. 07/397,344 filed Aug. 23, 1989, now abandoned, which was a continuation of application Ser. No. 07/206,489 filed June 14, 1988, now abandoned.

BACKGROUND OF THE INVENTION

1. Field of the Invention

The present invention relates to an optical scanning apparatus and, more particularly, to an optical scanning apparatus suitable for use in a multi-laser beam printer in which a plurality of modulated light beams are introduced through light deflectors onto positions on an original which are spaced in a subscanning direction so as to scan the original to form an image of the original.

2. Description of the Related Art

Optical scanning apparatus have a wide use in image information apparatuses, image processing terminal devices and so forth. Recently, various types of multi-beam scanning apparatuses have been proposed in which a plurality of scanning light beams are used simultaneously, in place of the single scanning light beam used in a conventional apparatus.

In particular, an optical scanning apparatus which employs a plurality of light beams for simultaneously scanning different portions of an original is finding increasing use as being suitable for use in multi-color printers and full-color printers.

Obviously, a multi-beam type scanning apparatus capable of scanning an object simultaneously with a plurality of beams is obtainable by combining a plurality of optical scanning devices each being capable of emitting a single scanning beam. Such a design, however, is not preferred because the size of the whole apparatus becomes impractically large. To obviate this problem, proposals have been made for a multi-beam type scanning apparatus which is capable of performing simultaneous scanning with a plurality of scanning beams using a single optical scanning unit.

For instance, the specification of U.S. Pat. No. 4,561,717 discloses a multi-beam scanning apparatus which employs a single light deflector. More particularly, this patent proposes the use of a common light deflector which is composed of a polygon mirror and an f-$\theta$ lens and which deflects a plurality of scanning light beams. The patent also proposes the use of a cylindrical lens disposed in the vicinity of an object and intended for correcting image inclination caused by the scanning.

With this arrangement, undesirable scanning line curvature caused by the common use of a single f-$\theta$ lens, is eliminated by the use of a cylindrical lens. This arrangement, however, has many disadvantages. For example, the cylindrical lens must have a large length corresponding to the number of the scanning lines and must be placed in the vicinity of the scanning object, with the result that the design of the apparatus is undesirably restricted.

SUMMARY OF THE INVENTION

Accordingly, an object of the present invention is to provide an optical scanning apparatus which is capable of correcting curvature of the scanning line without using any optical device which would restrict the design of the apparatus, e.g., the conventionally used cylindrical lens disposed in the vicinity of the scanning object, and which is capable of effecting simultaneous scanning by a plurality of light beams with a compact and simple arrangement having the ability to correct image inclination attributable to the scanning.

To this end, according to the present invention, there is provided an optical scanning apparatus comprising: rotatable light deflecting means for deflecting a plurality of scanning light beams; and lens means including a spherical surface having an f-$\theta$ characteristic and designed to receive the light beams deflected by the deflecting means at inclinations with respect to the optical axis of the spherical lens means and to focus the received light beams onto a scanning object;

wherein the following condition is met:

$$\left| \frac{\pi}{180} \cdot \frac{f \cdot 4h}{L} \sin^{-1}(\sin\theta \cdot \sin|\omega|) + \Delta(\omega) \right| < 2/\rho$$

where, f represents the focal distance of the spherical lens (mm), $\omega$ represents the effective scanning rotation angle of the light deflector (deg), $\Delta(\omega)$ represents the amount of curve of the scanning line caused by the light deflecting means in the subscanning direction (mm), $\rho$ represents the resolution of the scan on the scanning object (lines/mm), $\theta$ represents the angle of inclination of any one of the light beams with respect to the optical axis of the lens within a plane which contains the optical axis of the lens and which is perpendicular to the scanning axis (deg), L represents the distance between the first reflection surface of the light deflector and the principal plane of the lens adjacent the scanning object along the optical axis (mm), and h represents the height of incidence of the any one of the light beams to the lens (mm).

These and other objects, features and advantages of the present invention will become clear from the following description of the preferred embodiments when the same is read in conjunction with the accompanying drawings.

DESCRIPTION OF THE PREFERRED EMBODIMENTS

Figure 1:
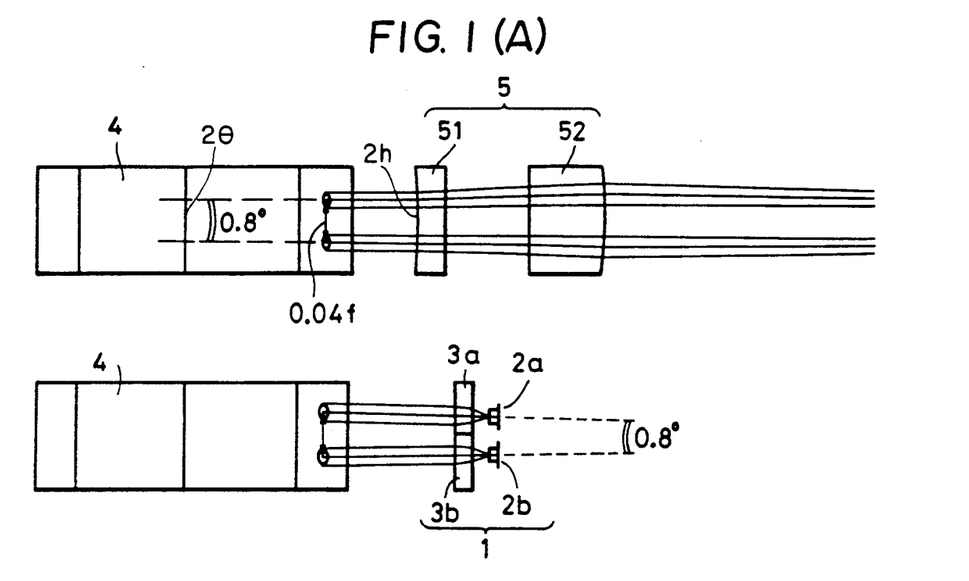
FIGS. 1A and 1B are schematic illustrations of an embodiment of the present invention.

FIGS. 1A and 1B, respectively, are a side elevational view and a plan view of an embodiment of the optical scanning apparatus of the present invention.

The optical scanning apparatus has light sources 2a, 2b such as semiconductor lasers, collimator lenses 3a, 3b, and a light deflector 4 including a polygon mirror. A reference numeral 5 denotes a spherical image-forming lens constituted by an f-θ lens system composed of a concave lens 51 and a convex lens 52.

This embodiment is so designed that two beams emitted from the lasers 2a and 2b are inclined in opposite directions at an angle, e.g., 0.4°, with respect to the optical axis of the image-forming lens 5. Thus, these two beams diverge at an angle of 0.8° and impinge upon the reflection surface of the polygon mirror 4. The beams reflected by the reflection surface of the polygon mirror are focused through the image-forming lens 5 onto different portions of the scanning object so as to scan the object.

In the illustrated embodiment, two beams for simultaneously scanning the object are incident to the image-forming lens 5 as out-of-axis beams. However, good conditions of focusing on the object surface are obtained because the image-forming lens 5 is constituted by an f-θ lens system composed of a concave lens 51 and a convex lens 52.

It is to be understood that the curvature of the scanning line on the object, caused when a beam obliquely impinges upon the image forming lens, appears in the direction opposite to that caused when the image-forming lens is used in an out-of-axis state. In the illustrated embodiment, correction of the curvature is effected by making use of this phenomenon, i.e., by compensating one curvature with the other.

When a plurality of light beams are introduced onto the scanning object after scanning by a common optical scanning system as in the described embodiment, the light beams should previously be separated by a distance greater than a predetermined distance.

It is assumed here that the position of incidence of each beam to an f-θ lens system is spaced by h (mm) from the optical axis. The non-corrected scanning line curvature at each scanning angle ω (deg) is represented by $A = \Delta(\omega)$(mm). On the other hand, the amount B that the beam curves after correction when the beam impinges upon the lens system at an angle θ (deg) with respect to the optical axis within a plane which contains the optical axis of the lens and which is perpendicular to the scanned plane is determined as follows.

$$B = \frac{\pi}{180} \cdot \frac{f \cdot 4h}{L} \sin^{-1} (\sin \theta \cdot \sin|\omega|)$$

The actual curvature of the scanning line on the scanned object is given as the sum (A + B) of these curve amounts. In the formula shown above, a symbol f represents the focal distance of the f-θ lens. The symbol L represents the distance between the first reflection surface of the light deflector and the principal plane of the lens adjacent the scanning medium as measured along the optical axis. The term "first reflecting surface of the light deflector" means the surface of the deflector by which a light beam from a light source is reflected for the first time by the deflector.

The present inventors have found that, in order to effect simultaneous optical scanning with a plurality of beams, the amount of residual curvature represented by (A + B) with respect to the amount A of non-corrected curvature should not be greater than a value which is twice the commanded resolution to be attained by the optical scanning apparatus. That is, the condition of $A + B < 2/\mu$ should be met, where $\mu$ represents the resolution (lines/mm) to be attained on the scanning object.

More specifically, this condition is expressed by the following formula (1).

$$|A + B| = \left| \frac{\pi}{180} \cdot \frac{f \cdot 4h}{L} \sin^{-1}(\sin\theta \cdot \sin\omega) + \Delta(\omega) \right| < 2/\rho \quad (1)$$

The constituent parts of the described embodiments are designed and constructed such that the condition of the formula (1) above is met.

Figure 2:
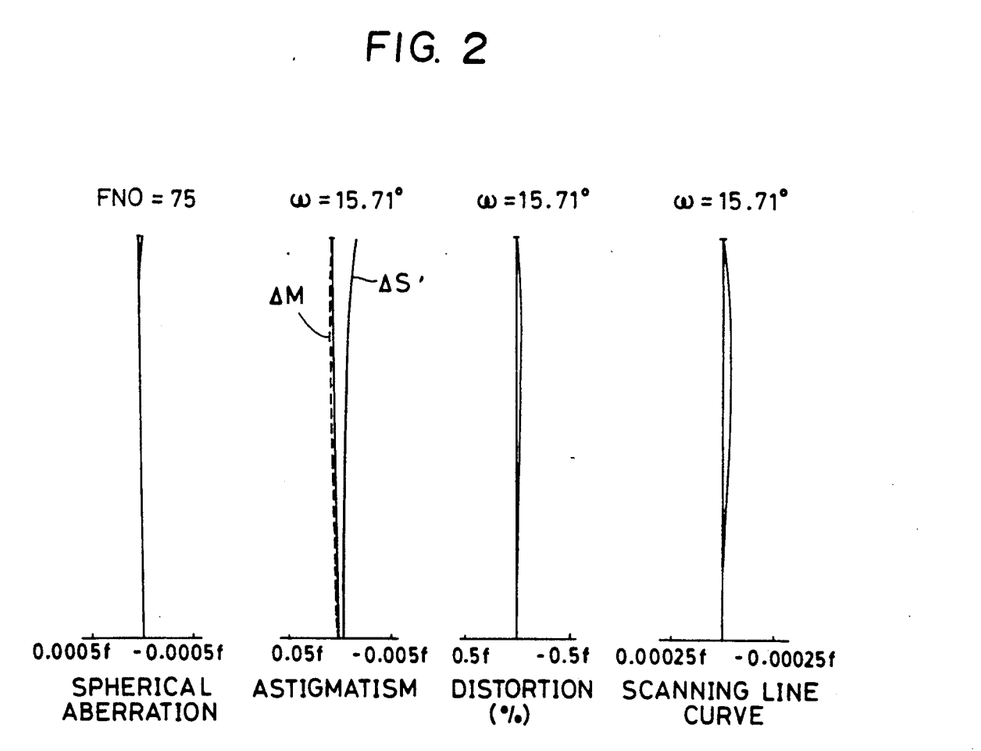
FIG. 2 graphically illustrates various aberrations and curvature of the scanning line as observed in a first numerical example of the present invention.

Table 1 shows a first numerical example of the f-θ lens system used in this embodiment. In Table 1, R1 and R2 are the radii of curvature of lens 51, R3 and R4 are the radii of curvature of lens 52, D1, D2 and D3 are the thicknesses of and spacing between lenses 51 and 52, and N1, N2 and N3 are the indices of refraction of lens 51, air, and lens 52, respectively. Aberrations and the amount of curvature of the scanning line on the scanned object observed with the first numerical example are graphed in FIG. 2. The first numerical example corresponds to the case where each beam is inclined at an inclination angle θ of 0.4°, i.e., when these beams diverge at an angle of 0.8° with respect to each other.

TABLE 1

| (First Numerical Example) | | |
|---|---|---|
| $R_1 = -0.4908$ f | $D_1 = 0.02824$ f | $N_1 = 1.51072$ |
| $R_2 = 10.3596$ f | $D_2 = 0.08157$ f | $N_2 = 1$ |
| $R_3 = -28.8472$ f | $D_3 = 0.05993$ f | $N_3 = 1.78569$ |
| $R_4 = -0.4245$ f | | |

Distance between polygon center and image plane = 1.3545f Polygon outside diameter = 0.2912f Table 2 shows selected values for curvature at various scanning angles for the first numerical example. This table shows the curve amount $A = \Delta(\omega)$(mm), the curve amount B which is given by $$B = \frac{\pi}{180} \cdot \frac{f \cdot 4h}{L} \sin^{-1}(\sin\theta \cdot \sin|\omega|)$$

and the value $|A + B|$, as obtained when the height h of the beam incident point to the f-θ lens system is 0.02 f.

TABLE 2

| (74 = −0.4°, h = 0.02 f, First Numerical Example) | | |
|---|---|---|
| ω (deg) | 0 | 11° | 15.5° |
| A (mm) | 0 | $-2.09$ f × $10^{-4}$ | $-3.54$ f × $10^{-4}$ |
| B (mm) | 0 | $2.69$ f × $10^{-4}$ | $3.77$ f × $10^{-4}$ |
| A + B | 0 | $0.6$ f × $10^{-4}$ | $0.23$ f × $10^{-4}$ |

It is assumed the apparatus has a resolution of 400 bits per inch, i.e., 400dpi ($\rho = 15.7$ lines/mm). For realizing a scanning line curvature which is not greater than $2/\rho = 0.127$ mm, correction can be satisfactorily effected as shown in Table 3 below even when the focal distance f of the f-θ lens system has a value represented by f = 206 mm to enable the scanning over a length of 210 mm which corresponds to the width of an A-4 size paper.

TABLE 3

| (θ = −0.4°, h = 0.2 f First Numerical Example) | | |
|---|---|---|
| ω (deg) | 0 | 11° | 15.5° |
| A (mm) | 0 | $-0.043$ | $-0.073$ |

TABLE 3-continued

| ($\theta = -0.4°$, h = 0.2 f First Numerical Example) | | | |
|---|---|---|---|
| ω (deg) | 0 | 11° | 15.5° |
| B (mm) | 0 | 0.055 | 0.078 |
| A + B (mm) | 0 | 0.012 | 0.005 |

Figure 3A:
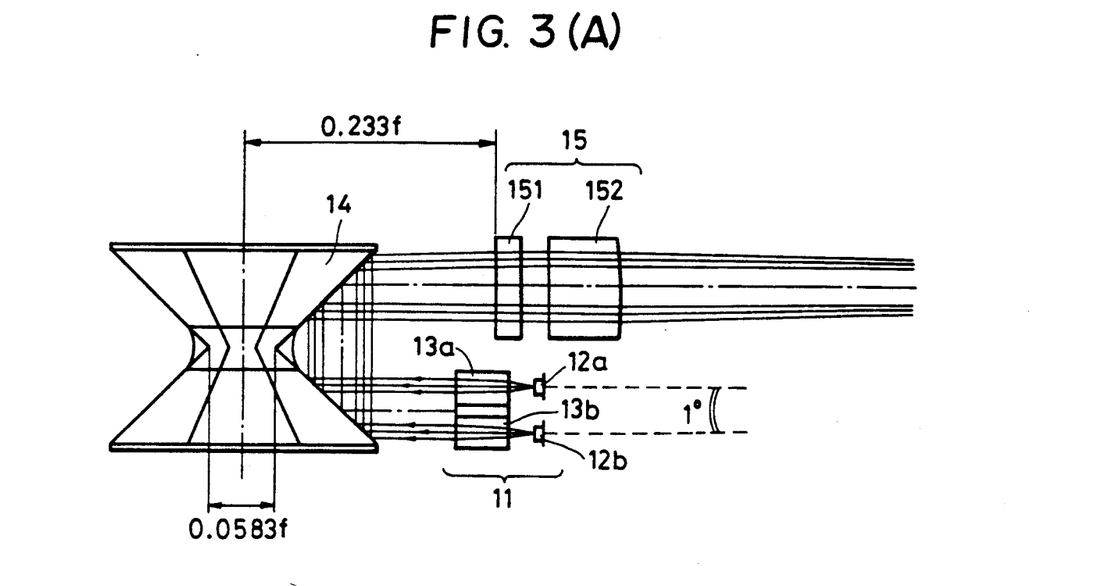
FIGS. 3A and 3B are schematic illustrations of another embodiment of the present invention.
Figure 3B:
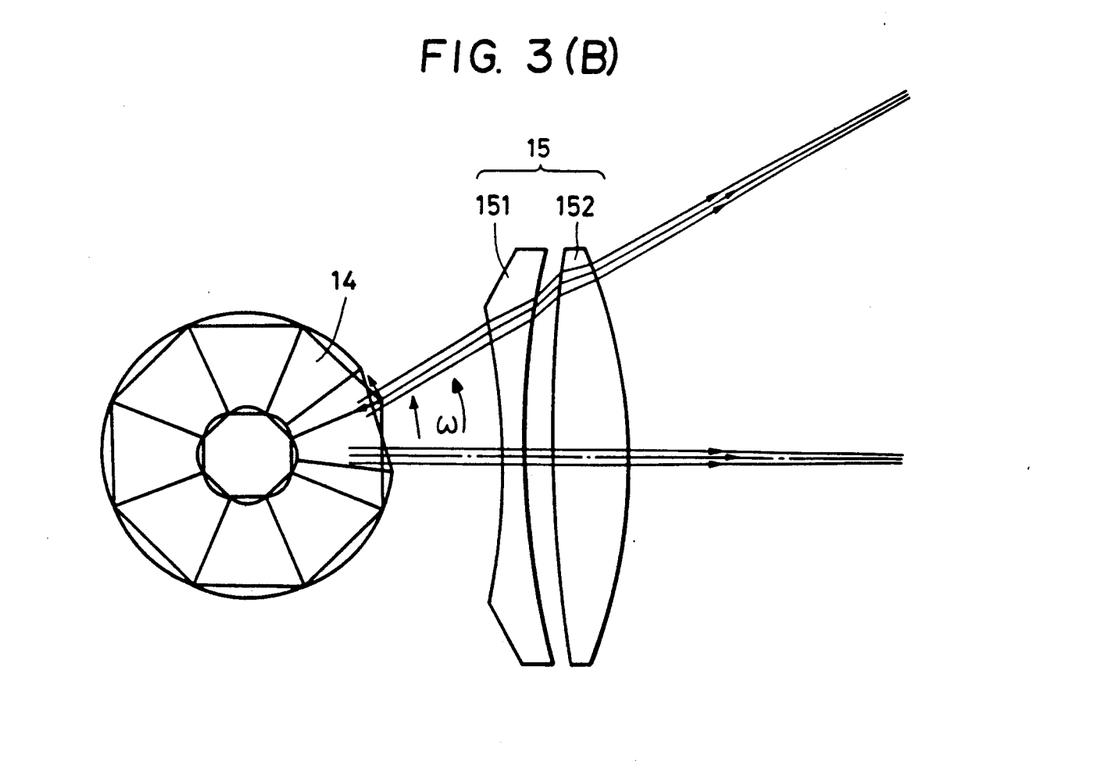

FIGS. 3A and 3B are a side elevational view and a plan view, respectively, of another embodiment of the optical scanning apparatus of the present invention.

The optical scanning apparatus has light sources 12a, 12b such as semiconductor lasers, collimator lenses 13a, 13b, and a light deflector 14 including a roof polygon mirror having eight upper reflection surfaces and eight lower reflection surfaces which cross at an angle of 90°. A reference numeral 15 denotes an image-forming lens constituted by an f-$\theta$ lens system composed of a concave lens 151 and a convex lens 152.

This embodiment is so designed that two beams emitted from the lasers 12a and 12b are inclined in opposite directions at an angle, e.g., 0.5°, with respect to the optical axis of the image-forming lens 15. Thus, these two beams diverge at an angle of 1.0° and impinge upon the lower reflection surface of the roof polygon mirror 14. The beams are then reflected by the upper reflection surface of the roof polygon mirror 14 and are focused through the image-forming lens 15 onto different portions of the scanning object so as to scan the object.

In the illustrated embodiment, two beams for simultaneously scanning the object are incident to the image-forming lens 15 as out-of-axis beams. However, good conditions of focusing on the object surface are obtained because the image-forming lens 15 is constituted by an f-$\theta$ lens system composed of a concave lens 151 and a convex lens 552.

In addition, correction of image inclination attributable to the scanning is effected by virtue of the roof polygon mirror which has upper reflection surfaces and lower reflection surfaces crossing each other at an angle of 90°.

It is to be understood that the curvature Of the scanning line on the object, caused when a beam obliquely impinges upon the image forming lens, appears in the direction opposite to that caused when the image-forming lens is used in an out-of-axis state. In the illustrated embodiment, correction of the curvature is effected by making use of this phenomenon, i.e., by compensating one curvature with the other.

When a plurality of light beams are introduced onto the scanning object after scanning by a common optical scanning system as in the described embodiment, the light beams should previously be separated by a distance greater than a predetermined distance.

It is assumed here that the position of incidence of each beam to an f-$\theta$ lens system is spaced by h (mm) from the optical axis. The non-corrected scanning line curvature at each scanning angle ω (deg) is represented by A=Δ(ω)(mm). On the other hand, the amount B that the beam curves after correction when the beam impinges upon the lens system at an angle $\theta$ (deg) with respect to the optical axis within a plane which contains the optical axis of the lens and which is perpendicular to the scanned plane is determined as follows.

$$B = \frac{\pi}{180} \cdot \frac{f \cdot 4h}{L} \sin^{-1}(\sin\theta \cdot \sin|\omega|)$$

The actual curvature of the scanning line on the scanned object is given as the sum (A+B) of these curve amounts. In the formula shown above, a symbol f represents the focal distance of the f-$\theta$ lens. The symbol L represents the distance between the first reflection surface of the light deflector and the principal plane of the lens adjacent the scanning medium as measured along the optical axis. The term "first reflection surface" is used to mean the surface of the deflector by which a light beam from a light source is reflected for the first time. Thus, in the arrangement of FIG. 3(A), the first reflection surface is the lower reflection surface of the half polygon mirror 14.

The present inventors have found that, in order to effect simultaneous optical scanning with a plurality of beams, the amount of residual curvature represented by (A+B) with respect to the amount A of non-corrected curvature should not be greater than a value which is twice the commanded resolution to be attained by the optical scanning apparatus. That is, the condition A+B<2/ρ should be met, where ρ represents the resolution (lines/mm) to be attained on the scanning object.

More specifically, this condition is expressed by the following formula (1).

$$|A + B| = \left| \frac{\pi}{180} \cdot \frac{f \cdot 4h}{L} \sin^{-1}(\sin\theta \cdot \sin|\omega|) + \Delta(\omega) \right| < 2/\rho \quad (1)$$

The constituent parts of the described embodiments are designed and constructed such that the condition of the formula (1) above is met.

Figure 4:
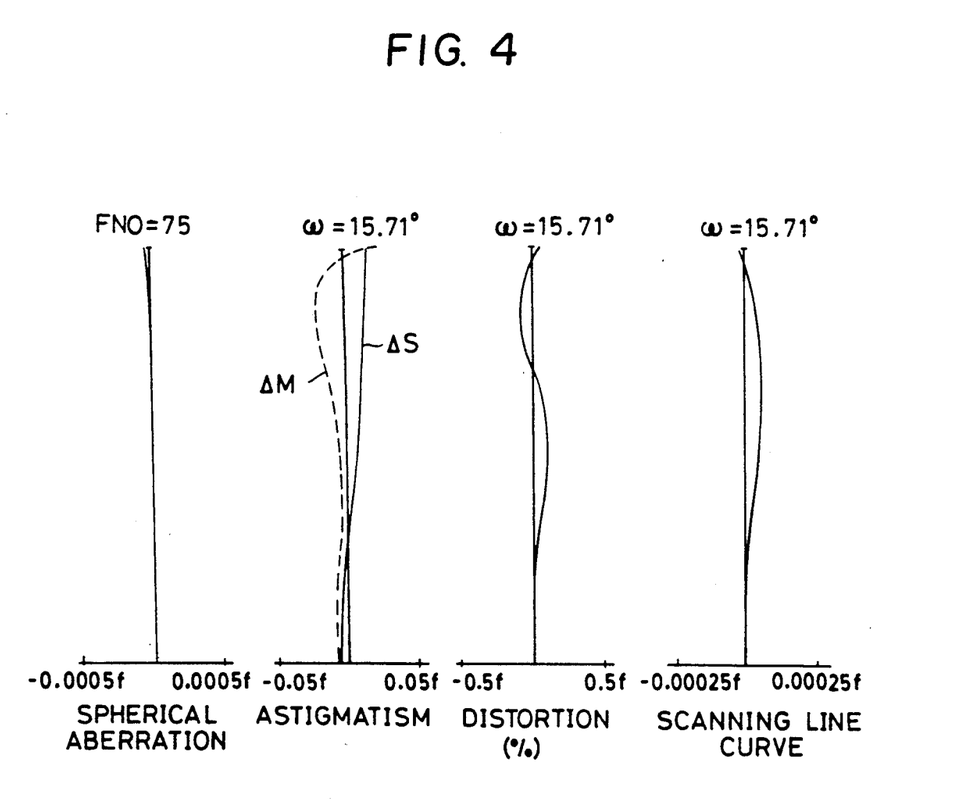
FIG. 4 graphically illustrates various aberrations and curvature of the scanning line as observed in a second numerical example of the present invention.
Figure 5:
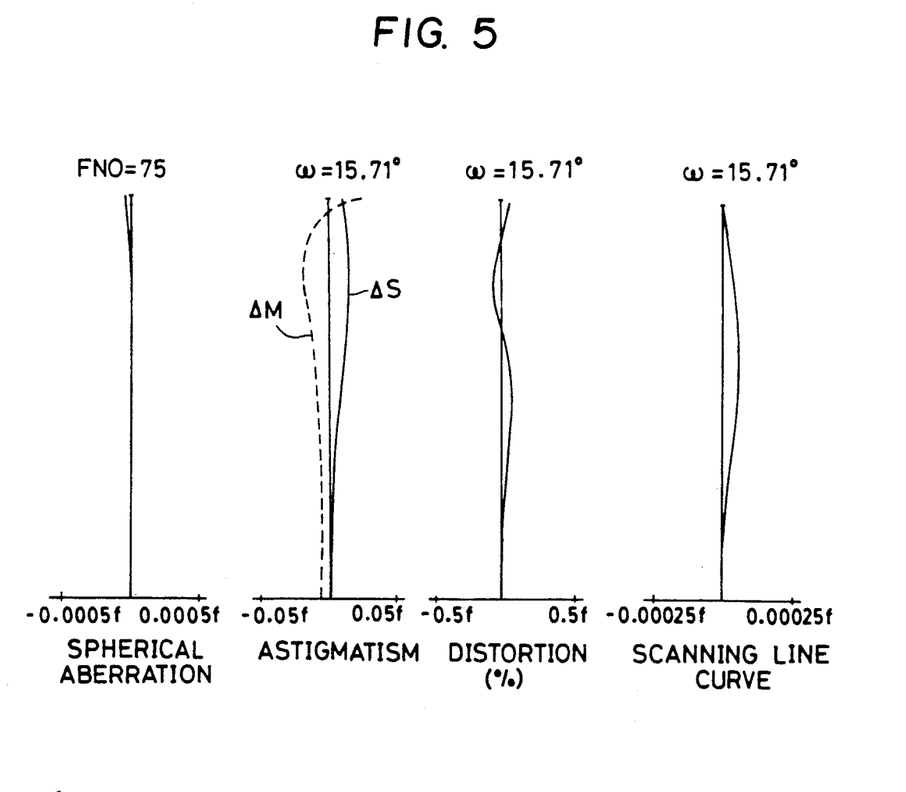
FIG. 5 graphically illustrates various aberrations and curvature of the scanning line as observed in a third numerical example of the present invention.

Tables 4 and 5 show second and third numerical examples of the f-$\theta$ lens system used in this embodiment. In Tables 4 and 5, R1 and R2 are the radii of curvature of lens 151, R3 and R4 are the radii of curvature of lens 152, D1, D2 and D3 are the thicknesses of and spacing between lenses 151 and 152, and N1 N2, and N3 are the indices of refraction of lens 151, air, and lens 152, respectively. Aberrations and the amounts of curvature of the scanning lines on the scanned object observed with the second and third numerical examples are graphed in FIG. 4 and 5. The second numerical example corresponds to the case where each of two light beams is inclined at an inclination angle $\theta$ of 0.5°, i.e., when these beams diverge at an angle of 1.0° with respect to each other. On the other hand, the third numerical example corresponds to the case where each of two light beams is inclined at an inclination angle $\theta$ of 0.25°, i.e., when these beams diverge at an angle of 0.5° with respect to each other.

TABLE 4

| (Second Numerical Example) | | |
|---|---|---|
| $R_1 = -0.9281$ f | $D_1 = 0.02312$ f | $N_1 = 1.51072$ |
| $R_2 = 0.7563$ f | $D_2 = 0.02459$ f | $N_2 = 1$ |
| $R_3 = 1.1308$ f | $D_3 = 0.06880$ f | $N_3 = 1.78569$ |
| $R_4 = -0.5508$ f | | |

Distance between polygon center and image plane=1.3545f
Polygon outside diameter=0.2670f
Distance between polygon first reflection surface and principal plane of lens=0.4369f

TABLE 5

| (Third Numerical Example) | | |
|---|---|---|
| $R_1 = -0.6525$ f | $D_1 = 0.0350$ f | $N_1 = 1.51072$ |
| $R_2 = 0.7460$ f | $D_2 = 0.03280$ f | $N_2 = 1$ |
| $R_3 = 1.3186$ f | $D_3 = 0.07066$ f | $N_3 = 1.78569$ |

TABLE 5-continued (Third Numerical Example)

$R_4 = -0.4688 \, f$

Distance between polygon center and image plane = 1.3893f
Polygon outside diameter = 0.2670f
Distance between polygon first reflection surface and principal plane of lens = 0.4257f Tables 6 and 7 show selected values of curvature at various scanning angles for the second and third numerical examples. These tables show the curve amounts $A = \Delta(\omega)(mm)$, the curve amounts B which are given by $$B = \frac{\pi}{180} \cdot \frac{f \cdot 4h}{L} \sin^{-1}(\sin\theta \cdot \sin|\omega|)$$

and the values $A + B$, as obtained when the height h of the beam incident point to the f-$\theta$ lens systems is 0.0243f.

It is assumed the apparatus has a resolution of 400 bits per inch, i.e., 400dpi ($\rho = 15.7$ lines/mm). For realizing a scanning line curvature which is not greater than $2/\rho = 0.127$ mm, correction can be satisfactorily

TABLE 6

| ($\theta = -0.5°$, h = 0.0243 f, Second Numerical Example) | | | | | |
|---|---|---|---|---|---|
| $\omega$ (deg) | 0 | 8.34° | 11.82° | 15.02° | 15.71° |
| A (mm) | 0 | $-2.62 \, f \times 10^{-4}$ | $-4.37 \, f \times 10^{-4}$ | $-5.04 \, f \times 10^{-4}$ | $-4.99 \, f \times 10^{-4}$ |
| B (mm) | 0 | $2.82 \, f \times 10^{-4}$ | $3.98 \, f \times 10^{-4}$ | $5.03 \, f \times 10^{-4}$ | $5.25 \, f \times 10^{-4}$ |
| A + B | 0 | $0.20 \, f \times 10^{-4}$ | $0.39 \, f \times 10^{-4}$ | $0.01 \, f \times 10^{-4}$ | $0.26 \, f \times 10^{-4}$ |

TABLE 7

| ($\theta = -0.25°$, h = 0.0243 f, Third Numerical Example) | | | | | |
|---|---|---|---|---|---|
| $\omega$ (deg) | 0 | 8.34° | 11.82° | 15.02° | 15.71° |
| A (mm) | 0 | $-1.58 \, f \times 10^{-4}$ | $-2.42 \, f \times 10^{-4}$ | $-2.40 \, f \times 10^{-4}$ | $-2.25 \, f \times 10^{-4}$ |
| B (mm) | 0 | $1.45 \, f \times 10^{-4}$ | $2.04 \, f \times 10^{-4}$ | $2.58 \, f \times 10^{-4}$ | $2.70 \, f \times 10^{-4}$ |
| A + B | 0 | $0.13 \, f \times 10^{-4}$ | $0.38 \, f \times 10^{-4}$ | $0.18 \, f \times 10^{-4}$ | $0.45 \, f \times 10^{-4}$ | effected as shown in Tables 8 and 9 below even when the focal distance f of the f-$\theta$ lens system has a value represented by f=275 mm to enable the scanning over a length of 297 mm which corresponds to the width of an A-3 size paper.

According to the present invention, a plurality of light beams are incident on different portions of an f-$\theta$ lens at angles which satisfy predetermined conditions. With this arrangement, it is possible substantially to eliminate any image inclination attributable to the

TABLE 8

| ($\theta = -0.5°$, h = 0.0243 f, Second Numerical Example) | | | | | |
|---|---|---|---|---|---|
| $\omega$ (deg) | 0 | 8.34° | 11.82° | 15.02° | 15.71° |
| A (mm) | 0 | -0.072 | -0.120 | -0.139 | -0.137 |
| B (mm) | 0 | 0.078 | 0.109 | 0.138 | 0.144 |
| A + B | 0 | 0.006 | 0.011 | 0.001 | 0.007 |

TABLE 9

| ($\theta = -0.25°$, h = 0.0243 f, Third Numerical Example) | | | | | |
|---|---|---|---|---|---|
| $\omega$ (deg) | 0 | 8.34° | 11.82° | 15.02° | 15.71° |
| A (mm) | 0 | -0.043 | -0.067 | -0.066 | -0.062 |
| B (mm) | 0 | 0.040 | 0.056 | 0.071 | 0.074 |
| A + B | 0 | 0.003 | 0.011 | 0.005 | 0.012 | scanning without requiring any specific optical member which would necessarily be disposed in the vicinity of the scanned object and which would restrict the design of the apparatus. In addition, the undesirable curve of the scanning line on the scanning object can be corrected satisfactorily. It is thus possible to obtain a small-sized optical scanning device having superior image forming performance.

The described embodiments employs a pair of lasers as the beam sources. In general, however, different lasers exhibit different tendencies in the change of directions of the laser beams emitted therefrom, as well as different patterns of fluctuation in the output in response to change in the environmental conditions. It is, therefore, not practical to maintain constant beam direction and output level for each of the lasers.

It is therefore possible to use a single laser source as a beam source, for example a laser array having a plurality of laser emitters arranged linearly on a single chip, so that a plurality of laser beams are emitted from a single laser source.

It is also possible to obtain a plurality of laser beams by splitting a single laser beam from a single laser, by means of, for example, a beam splitter.

Figure 6:
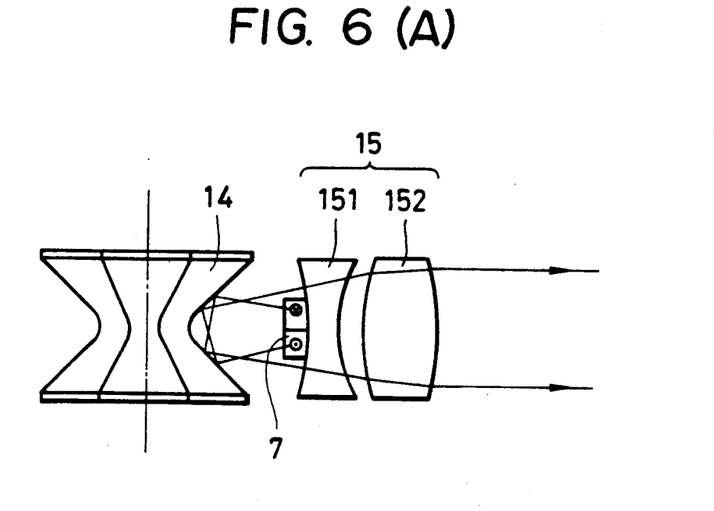
FIGS. 6A and 6B are schematic illustrations of a further embodiment of the present invention.

FIG. 6A shows a different embodiment in which scanning light beams are made to impinge upon the opposing reflection surfaces of the upper and lower sides of a roof polygon mirror.

If these two beams are made to impinge directly upon the roof polygon mirror, these beams would interfere with the f-$\theta$ lens 15. In this embodiment, therefore, a pair of triangular prisms 7a, 7b are disposed one on the other as illustrated in FIG. 6B so that the beams from the lasers 12a and 12b are turned by the respective reflection surfaces of these prisms so as to be directed towards the roof polygon mirror 14.

In this embodiment, since the scanning light beams are incident on different reflection surfaces, i.e., upper and lower reflection surfaces of the polygon mirror, it is possible to obtain a large distance between the laser beams although the points of reflection are positioned very close to each other, thus enabling the roof polygon mirror to have a reduced size.

It is also to be understood that this embodiment employs a pair of laser beams 12a and 12b which are disposed so as to oppose to each other, so that perturbation such as spatial and thermal interferences between two laser drivers (not shown) are eliminated.

Figure 7:
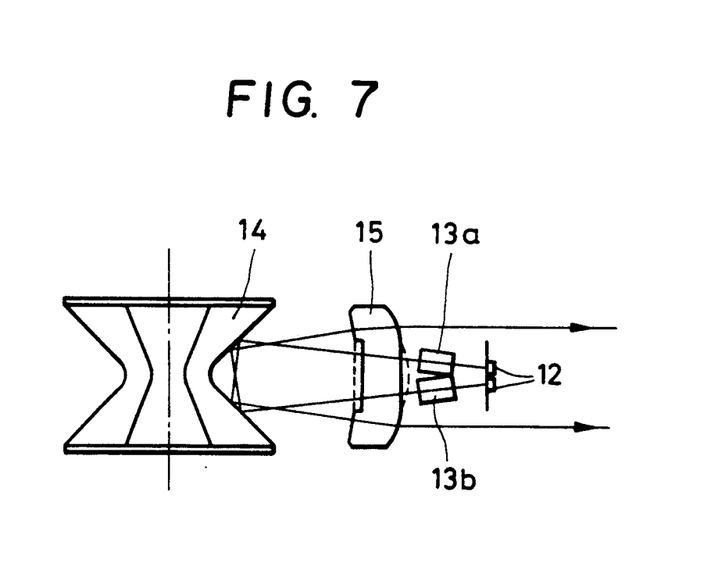
FIG. 7 is a schematic illustration of a still further embodiment of the present invention.

FIG. 7 shows a different embodiment in which the f-θ lens 15 has a flat portion in the vicinity of the optical axis thereof, so that the light beams from the lasers 12a and 12b are made to impinge upon the upper and lower sides of the roof polygon mirror 14 through the flat portion and then to reach the surface of the scanning object through the peripheral regions of the f-θ lens 15. This arrangement enables the size of the polygon mirror to be further reduced.

In the embodiments described hereinbefore, a pair of beams are introduced to and focused on different portions of the scanning object through a light deflector and an image-forming lens. It will be obvious, however, that the advantages of the invention are also obtainable when the apparatus employs more than two scanning light beams.

Figure 8:
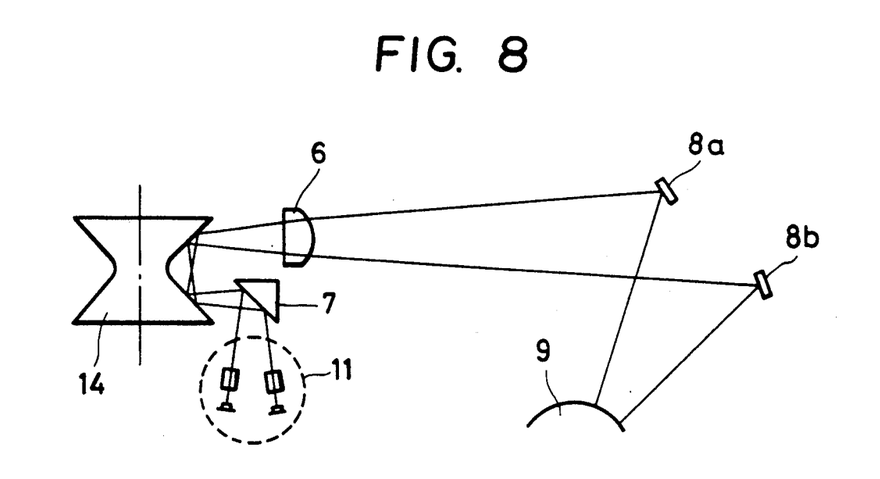
FIG. 8 is a schematic illustration of a still further embodiment of the present invention.

The described embodiments may be arranged such that the scanning light beams scanned by a light deflector and then passed through the image-forming lens 6 are introduced onto the surface of a scanning object such as, for example, a cylindrical photosensitive drum 9. This can easily be achieved by arrangements in which the beams are reflected by respective reflection mirrors 8a, 8b so as to impinge upon different portions of the scanning object, as shown in FIG. 8.

What is claimed is:

1. An optical scanning apparatus for scanning a scanning object along a scanning axis, said apparatus comprising:

rotatable light deflecting means for deflecting a plurality of scanning light beams; and lens means including a spherical surface having an f-θ characteristic, for receiving deflected light beams from said light deflecting means at a plurality of inclinations relative to the optical axis of said lens means, to focus the received deflected light beams onto the scanning object;

wherein the following condition is met:

$$\left| \frac{\pi}{180} \cdot \frac{f \cdot 4h}{L} \sin^{-1}(\sin\theta \cdot \sin|\omega|) + \Delta(\omega) \right| < 2/\rho$$

where f represents the focal distance of said lens means (mm), ω represents the effective scanning rotation angle of said light deflecting means (deg), Δ(ω) represents the amount of curve (mm) in a subscanning direction at each angle ω of the scanning line if a light beam were to enter said lens means at an incident height h parallel to the optical axis of said lens means, ρ represents the resolution of the scan on the scanning object (lines/mm), θ represents the angle of inclination of any one of the light beams relative to the optical axis of said lens means within a plane which contains the optical axis of said lens means and which is perpendicular to the scanning axis (deg), L represents the distance between a first reflection surface of said light deflecting means and a principal plane of said lens means adjacent the scanning object along the optical axis, and h represents the height of incidence of any one of said light beams on said lens means (mm) relative to the optical axis of said lens means.

2. An optical scanning apparatus according to claim 1, wherein said light deflecting means is a single polygon mirror.

3. An optical scanning apparatus according the claim 1, wherein said light deflecting means includes a roof polygon mirror which reflects said light beams an even number of times so as to introduce reflected light beams to said lens means.

4. An optical scanning apparatus according to claim 1, wherein said lens means includes a concave lens and a convex lens.

5. An optical scanning apparatus according to claim 1, further comprising a laser array including a plurality of linearly arranged laser beam emitting portions for producing the plurality of scanning light beams.

6. An optical scanning apparatus according to claim 1, further comprising reflecting means disposed between said lens means and the scanning object for reflecting said plurality of scanning light beams toward the scanning object.

7. An optical scanning apparatus for scanning a scanning object along a scanning axis, said apparatus comprising:

rotatable light deflecting means for deflecting a scanning light beam; and lens means including a spherical surface having an f-θ characteristic, for receiving a deflected light beam from said light deflecting means at an inclination relative to the optical axis of said lens means, to focus the received deflected light beam onto the scanning object;

wherein the following condition is met:

$$\left| \frac{\pi}{180} \cdot \frac{f \cdot 4h}{L} \sin^{-1}(\sin\theta \cdot \sin|\omega|) + \Delta(\omega) \right| < 2/\rho$$

where, f represents the focal distance of said lens means (mm), ω represents the effective scanning rotation angle of said light deflecting means (deg), Δ(ω) represents the amount of curve (mm) in a subscanning direction at each angle ω of the scanning line if a light beam were to enter said lens means at an incident height h parallel to the optical axis of said lens means, ρ represents the resolution of the scan on the scanning object (lines/mm), θ represents the angle of inclination of the light beam relative to the optical axis of said lens means within a plane which contains the optical axis of said lens means and which is perpendicular to the scanning axis (deg), L represents the distance between a first reflection surface of said light deflecting means and a principal plane of said lens means adjacent the scanning object along the optical axis, and h represents the height of incidence of the light beam on said lens means (mm) relative to the optical axis of said lens means.

8. An optical scanning apparatus according to claim 7, wherein said light deflecting means is a single polygon mirror.

9. An optical scanning apparatus according to claim 7, wherein said light deflecting means includes a roof polygon mirror which reflects said light beam an even number of times so as to introduce reflected light beam to said lens means.

10. An optical scanning apparatus according to claim 7, wherein said lens mean includes a concave lens and a convex lens.

11. An optical scanning apparatus according to claim 7, further comprising reflecting means disposed between said lens means and the scanning object for reflecting said scanning light beam toward the scanning object.

* * * * *